(12) United States Patent
Carey et al.

(10) Patent No.: US 8,231,497 B2
(45) Date of Patent: Jul. 31, 2012

(54) EIGHT SPEED AUTOMATIC TRANSMISSION

(75) Inventors: Clinton E. Carey, Highland, MI (US);
 James M. Hart, Belleville, MI (US);
 Andrew W. Phillips, Rochester, MI
 (US); Scott H. Wittkopp, Ypsilanti, MI
 (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/161,210

(22) Filed: Jun. 15, 2011

(65) Prior Publication Data

US 2011/0245019 A1 Oct. 6, 2011

Related U.S. Application Data

(62) Division of application No. 12/050,470, filed on Mar. 18, 2008, now Pat. No. 7,980,987.

(51) Int. Cl.
 *F16H 3/44* (2006.01)
(52) U.S. Cl. ........................................... 475/282
(58) Field of Classification Search .................. 475/282
 See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,913,556 B2 * | 7/2005 | Armstrong et al. | 475/269 |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,597,646 B2 * | 10/2009 | Kamm et al. | 475/277 |
| 7,789,792 B2 * | 9/2010 | Kamm et al. | 475/330 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0234093 A1 * | 9/2008 | Diosi et al. | 475/276 |
| 2008/0242493 A1 | 10/2008 | Carey et al. | |

FOREIGN PATENT DOCUMENTS

WO WO 2006074707 A1 * 7/2006
WO WO 2007006449 A1 * 1/2007

* cited by examiner

*Primary Examiner* — David D Le
*Assistant Examiner* — Erin D Bishop (57) ABSTRACT

An eight speed automatic transmission is provided having an input member, an output member, four planetary gear sets and five torque transmitting devices. Three of the planetary gear sets are simple and one planetary gear set is compound. Each of the plurality of planetary gear sets has first, second and third members: a sun gear, a ring gear and a planet carrier having a plurality of planet gears rotatably disposed thereon. Three of the torque transmitting devices are clutches and two of the devices are brakes. Eight embodiments of the transmission having different arrangements of the planetary gear sets, clutches and brakes are disclosed.

16 Claims, 10 Drawing Sheets

FIG. 1A

| GEAR STATE | GEAR RATIO | RATIO STEP | CLUTCHING ELEMENTS ||||| 
|---|---|---|---|---|---|---|---|
| | | | 92 | 94 | 82 | 84 | 86 |
| REV | -2.710 | | X | X | | | X |
| N | | -0.59 | O | O | | | |
| 1ST | 4.600 | | X | X | X | | |
| 2ND | 3.116 | 1.48 | X | X | | X | |
| 3RD | 2.128 | 1.46 | | X | X | X | |
| 4TH | 1.677 | 1.27 | | X | | X | X |
| 5TH | 1.305 | 1.29 | | X | X | | X |
| 6TH | 1.000 | 1.31 | | | X | X | X |
| 7TH | 0.834 | 1.20 | X | | X | | X |
| 8TH | 0.677 | 1.23 | X | | | X | X |

X = ON - ENGAGED CARRYING TORQUE
O = ON - ENGAGED NOT CARRYING TORQUE

| DEVICE | ZONE LOCATION | | | | | |
|---|---|---|---|---|---|---|
| | A | B | C | D | E | F |
| BRAKE 92 | X | | | | X | X |
| BRAKE 94 | X | | | | X | X |
| CLUTCH 82 | X | X | | | | X |
| CLUTCH 84 | | X | X | X | | X |
| CLUTCH 86 | | | X | X | X | X |

| DEVICE | ZONE LOCATION | | | | | |
|---|---|---|---|---|---|---|
| | A | B | C | D | E | F |
| BRAKE 92 | X | | | | X | X |
| BRAKE 94 | X | | | | X | X |
| CLUTCH 82 | | X | X | X | | X |
| CLUTCH 84 | | X | | | | X |
| CLUTCH 86 | | X | X | X | X | X |

FIG. 8B

EIGHT SPEED AUTOMATIC TRANSMISSION

CROSS-REFERENCE TO RELATED APPLICATIONS

This application is a divisional of U.S. application Ser. No. 12/050,470 filed on Mar. 18, 2008, which claims the benefit of U.S. Provisional Application No. 60/909,595 filed on Apr. 2, 2007. The disclosures of the above applications are incorporated herein by reference.

FIELD

The invention relates to a multiple speed automatic transmission having both a plurality of planetary gear sets and torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of planetary gear arrangements, friction clutches and fixed interconnections to achieve a plurality of gear ratios. The number and physical arrangement of the planetary gear sets generally are dictated by packaging, cost and desired speed ratios.

While current transmissions achieve their intended purpose, the need for new and improved automatic transmission configuration which exhibit improved performance, especially from the standpoints of efficiency, responsiveness and smoothness and improved packaging, primarily reduced size and weight, is essentially constant. Accordingly, there is a need for a cost-effective, compact and multi-speed transmission.

SUMMARY

An eight speed automatic transmission is provided having an input member, an output member, four planetary gear sets and five torque transmitting devices. Three of the planetary gear sets are simple and one planetary gear set is compound. Each of the plurality of planetary gear sets has first, second and third members: a sun gear, a ring gear and a planet carrier having a plurality of planet gears rotatably disposed thereon. Three of the torque transmitting devices are clutches and two of the devices are brakes. Eight embodiments of the transmission having different arrangements of the planetary gear sets, clutches and brakes are disclosed.

It is thus an aspect of the present invention to provide an eight speed automatic transmission.

It is another aspect of the present invention to provide an automatic transmission having four planetary gear sets.

It is another aspect of the present invention to provide an automatic transmission having three simple planetary gear sets and one compound planetary gear set.

It is another aspect of the present invention to provide an automatic transmission having four planetary gear sets and five torque transmitting devices.

It is another aspect of the present invention to provide an automatic transmission having four planetary gear sets, three clutches and two brakes.

It is another aspect of the present invention to provide an automatic transmission having three simple planetary gear sets, one compound planetary gear set, three clutches and two brakes.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
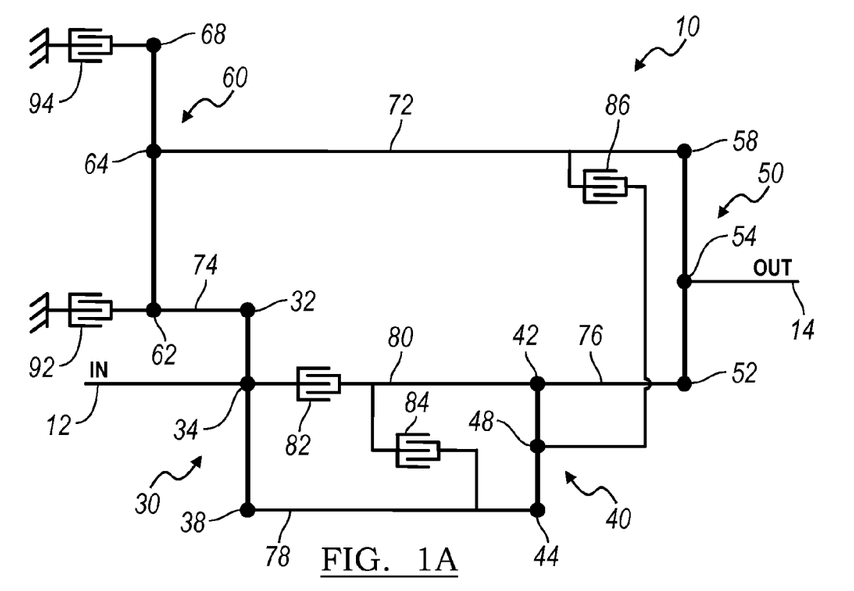
FIG. 1A is a lever diagram of an automatic transmission according to the principles of the present invention.
Figure 2:
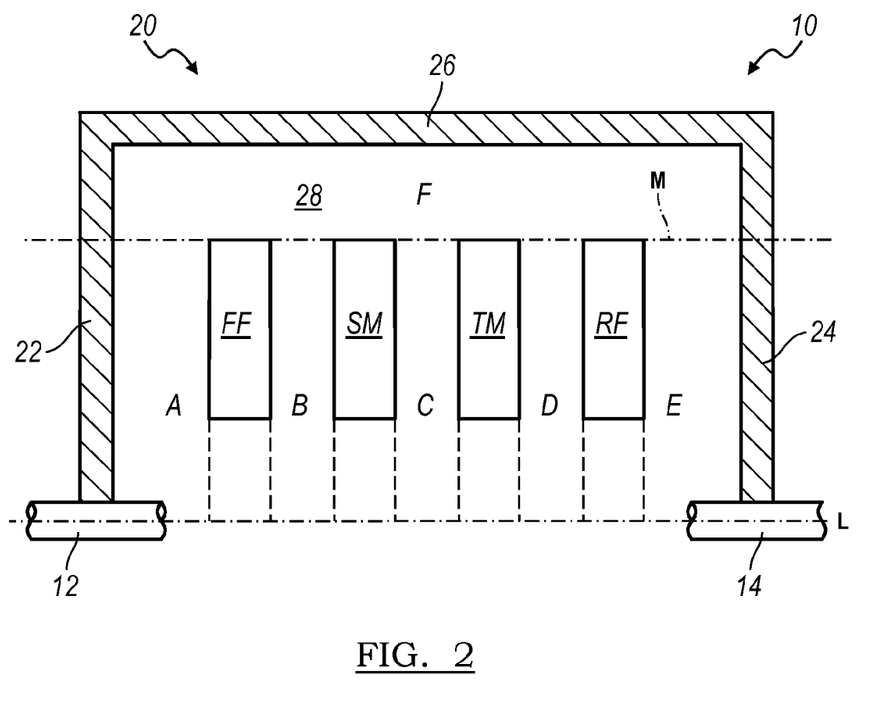
FIG. 2 is a diagrammatic view of an automatic transmission according to the principles of the present invention illustrating the zones of the transmission.

Referring now to FIGS. 1 and 2, in FIG. 1 an eight speed automatic transmission 10 according to the present invention is illustrated in a lever diagram. A lever diagram is a schematic representation of the components of an automatic transmission wherein the three fundamental mechanical components of a planetary gear set, the sun gear, the planet gear carrier and the ring gear are represented by nodes. The relative lengths of the bars between the nodes of a given planetary gear set represent the ratios between the gears of the gear set. Mechanical couplings or interconnections between the nodes of the various planetary gear sets are illustrated by horizontal lines and torque transmitting devices such as clutches and brakes are represented by nesting or interleaved fingers. If the device is a brake, one side of the device is grounded. Further explanation of the format, purpose and use of lever diagrams can be found in SAE Paper 810102 entitled "The Lever Analogy: A New Tool in Transmission Analysis" by Benford and Leising which is fully incorporated herein by reference.

The transmission 10 includes an input shaft 12, a first simple planetary gear set 30, a second compound planetary gear set 40, a third simple planetary gear set 50, a fourth simple planetary gear set 60 and an output shaft 14. The planetary gear sets 30, 40, 50 and 60 are connected between the input shaft 12 and the output shaft 14. The first simple planetary gear set 30 includes a first sun gear 32, a first planet gear carrier 34 that rotatably supports a first plurality of pinion or planet gears 36 and a first ring gear 38. The second compound planetary gear set 40 includes a second sun gear 42, a second planet gear carrier 44 that rotatably supports a second plurality of pairs of pinion or planet gears 46A and 46B and a second ring gear 48. The third simple planetary gear set 50 includes a third sun gear 52, a third planet gear carrier 54 that rotatably supports a third plurality of pinion or planet gears 56 and third a ring gear 58. The fourth simple planetary gear set 60 includes a fourth sun gear 62, a fourth planet gear carrier 64 that rotatably supports a fourth plurality of pinion or planet gears 66 and a fourth ring gear 68.

The lever diagram of FIG. 1 illustrates the common or shared mechanical components and architecture of the various arrangements of the automatic transmission 10 illustrated in FIGS. 2A through 9A. Thus the following explanation of the interconnections between the planetary gear sets, clutches and brakes applies to the family of transmission arrangements disclosed herein. The input shaft 12 is always coupled to the first planet carrier 34 of the first planetary gear set 30. The output shaft 14 is always coupled to and driven by the planet carrier 54 of the third planetary gear set 50. A first shaft, quill or interconnecting member 72 always couples the third ring gear 58 of the third planetary gear set 50 to the fourth planet carrier 64 of the fourth planetary gear set 60. A second shaft, quill or interconnecting member 74 always couples the first sun gear 32 of the first planetary gear set 30 to the fourth sun gear 62 of the fourth planetary gear set 60. A third shaft, quill or interconnecting member 76 always couples the second sun gear 42 of the second compound planetary gear set 40 to the third sun gear 52 of the third planetary gear set 50. A fourth shaft, quill or interconnecting member 78 always couples the first ring gear 38 of the first planetary gear set 30 to the second planet carrier 44 of the second compound planetary gear set 40. A fifth shaft, quill or intermediate member 80 is connected to the second sun gear 42 of the second planetary gear set 40.

Figure 1B:
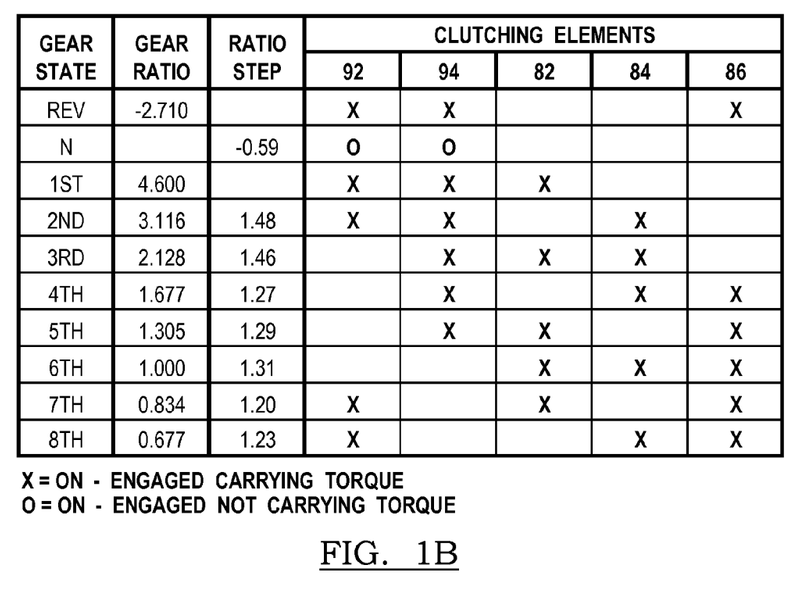
FIG. 1B is a truth table presenting the state of engagement of the various torque transmitting clutches and brakes in each of the available forward and reverse speeds or gear ratios of the automatic transmission illustrated in FIG. 1A.

The automatic transmission 10 includes a plurality of torque transmitting mechanisms or devices including a first clutch 82, a second clutch 84, a third clutch 86, a first brake 92 and a second brake 94. The first clutch 82 is always disposed between the first planet carrier 34 of the first planetary gear set 30 and the input shaft 12 through fifth shaft, quill or intermediate member 80 to the second sun gear 42 of the second compound planetary gear set 40. The second clutch 84 is always disposed between the first ring gear 38 of the first planetary gear set 30 and the second planet carrier 44 of the second compound planetary gear set 30 which are always coupled by the fourth shaft, quill or interconnecting member 78 and the second sun gear 42 of the second compound planetary gear set 40. A third clutch 86 is disposed between the second ring gear 48 of the second planetary gear set 40 and the third ring gear 58 of the third planetary gear set 50 and the fourth planet carrier 64 of the fourth planetary gear set 60 which are always coupled by the first shaft, quill or intermediate member 72. The first brake 92 selectively connects the fourth sun gear 62 of the fourth planetary gear set 60 and the first sun gear 32 of the first planetary gear set 30 which are always coupled by the second shaft, quill or intermediate member 74 to ground. The second brake 94 selectively connects the fourth ring gear 68 of the fourth planetary gear set 60 to ground The transmission 10 is capable of transmitting torque from the input shaft 12 to the output shaft 14 in eight forward speed and torque ratios and one reverse speed and torque ratio as indicated in the truth table of FIG. 1A. Each of the eight forward speed and torque ratios and the reverse speed and torque ratios is attained by engagement of a combination of three of the torque transmitting devices, i.e., the first clutch 82, the second clutch 84, the third clutch 86, the first brake 92 and the second brake 94.

With reference to the truth table of FIG. 1A, it will be appreciated that reverse gear is attained by activation or engagement of the first brake 92, the second brake 94 and the third clutch 86. Neutral is attained by activation or engagement of the first brake 92 and the second brake 94. It should be noted, however, that although the first brake 92 and the second brake 94 are engaged, they are not carrying torque.

First gear is attained by activation or engagement of the first brake 92, the second brake 94 and the first clutch 82. Second gear is attained by activation or engagement of first brake 92, the second brake 94 and the second clutch 84. Third gear is attained by activation or engagement of the second brake 94, the first clutch 82 and the second clutch 84. Fourth gear is attained by activation or engagement of the second brake 94, the second clutch 84 and the third clutch 86. Fifth gear is attained by activation or engagement of the second brake 94, the first clutch 82 and the third clutch 86. Sixth gear is attained by activation or engagement of the first clutch 82, the second clutch 84 and the third clutch 86. Seventh gear is attained by activation or engagement of the first brake 92, the first clutch 82 and the third clutch 86. Eighth gear is attained by activation or engagement of the first brake 92, the second clutch 84 and the third clutch 86.

Referring now to FIG. 2, the automatic transmission 10 includes a housing 20 including or defining a first or front end wall 22, a second or rear end wall 24, and a third side wall 26. The third side wall 26 interconnects the first end wall 22 and the second end wall 24 to provide or define a space or cavity 28 in which the planetary gear sets 30, 40, 50 and 60 and the torque transmitting mechanisms such as the clutches 82, 84 and 86 and the brakes 92 and 94 are located. Further, the space or cavity 28 has a plurality of Zones A, B, C, D, E, and F in which the clutches 82, 84 and 86 and the brakes 92 and 94 will be specifically positioned in accordance with the preferred embodiments of the present invention.

As shown in FIG. 2 and throughout the several views, Zone A is defined by the area bounded on the left by the first end wall 22, on the right by a planetary gear set FF in a first or forward position, on the bottom by a reference line "L" which is a line that is parallel and preferably coaxial with the input shaft 12 and the output shaft 14 and on the top by a reference line "M" which is a line that extends along the outer diameters of the planetary gear sets and is parallel to the reference line 'L." Zone B is defined by the area bounded on the left by the planetary gear set FF, on the right by a planetary gear set SM in a second, middle position, radially outward by the reference line "M" and radially inward by the reference line "L." Zone C is defined by the area bounded on the left by the planetary gear set SM, on the right by a planetary gear set TM in a third, middle position, radially outward by the reference line "M", and radially inward by the reference line "L." Zone D is defined by the area bounded on the left by the planetary gear set TM, on the right by a planetary gear set RF in a rear or fourth position, radially outward by the reference line "M", and radially inward by the reference line "L". Zone E is defined by the area bounded: on the left by the planetary gear set RF, on the right by the second end wall 24, radially outward by the reference line "M", and radially inward by the reference line "L". Zone F is defined by the area bounded on the left by the first end wall 22, on the right by the second end wall 24, radially inward by the reference line "M" and radially outward by the third side wall 26. Since the positions of the planetary gear sets 30, 40, 50 and 60 will change within the transmission cavity 28 in the different embodiments, the positions have been generically identified as FF, SM, TM and RF in FIG. 2 to define the Zones A, B, C, D, E and F. However, the Zones described above will not change and will remain the same throughout the several views.

Figure 3A:
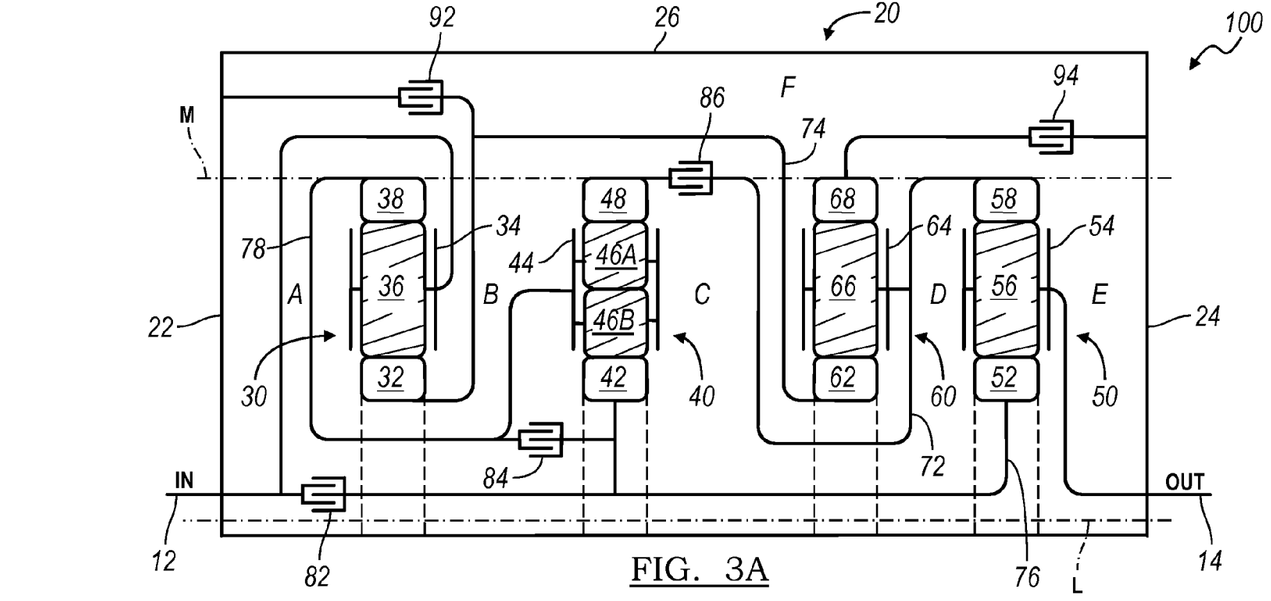
FIG. 3A is a schematic diagram of a first embodiment of an automatic transmission according to the principles of the present invention.

Referring now to FIG. 3A, a first embodiment of the automatic transmission 100 is shown. In the first embodiment of the automatic transmission 100, the planetary gear sets are longitudinally arranged in the following order from left to right: 30-40-60-50. Specifically, the first planetary gear set 30 is disposed adjacent the first or front end wall 22 in the first position FF, the second compound planetary gear set 40 is disposed adjacent the first planetary gear set 30 in the second position SM, the fourth planetary gear set 60 is disposed adjacent the second compound planetary gear set 40 in the third position TM and the third planetary gear set 50 is disposed adjacent the second or rear end wall 24 in the fourth position RF. The torque transmitting devices are intentionally located within specific Zones in order to provide advantages in overall transmission size, packaging efficiency, and reduced manufacturing complexity. In the first embodiment automatic transmission 100 shown in FIG. 3A, the first clutch 82 is disposed in Zone A, the second clutch 84 is disposed in Zone B, the third clutch 86 is disposed in Zone C and the first brake 92 and the second brake 94 are disposed in Zone F.

Figure 3B:
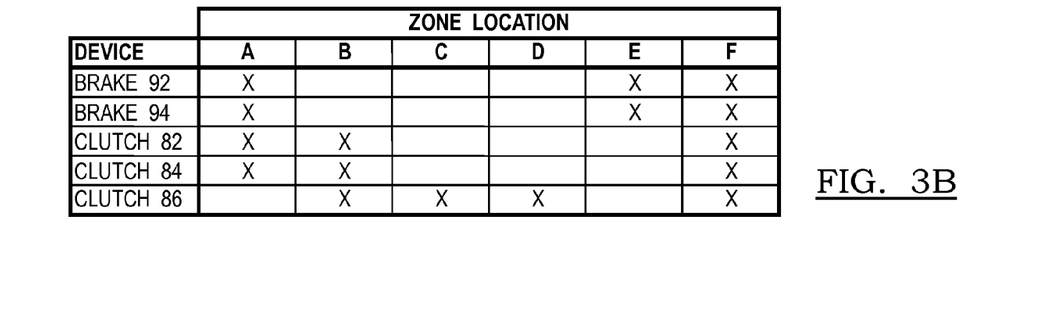
FIG. 3B is a chart showing feasible locations of the clutch and brake components for the first embodiment of the automatic transmission shown in FIG. 3A.

However, the first embodiment of the automatic transmission 100 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 3B. An "X" in the chart indicates that the first embodiment of the automatic transmission 100 comprehends locating the first clutch 82, the second clutch 84, the third clutch 86, the first brake 92 and the second brake 94 in the referenced Zone.

Figure 4A:
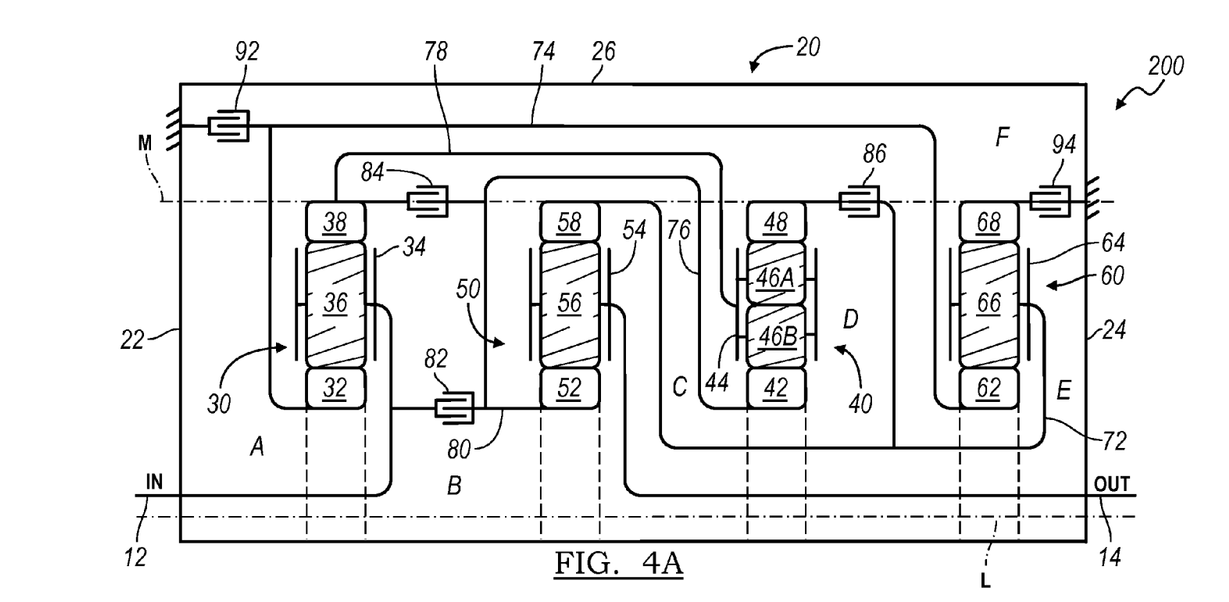
FIG. 4A is a schematic diagram of a second embodiment of an automatic transmission according to the principles of the present invention.

Referring now to FIG. 4A, a second embodiment of the automatic transmission 200 is shown. In the second embodiment of the automatic transmission 200, the planetary gear sets are longitudinally arranged in the following order from left to right: 30-50-40-60. Specifically, the first planetary gear set 30 is disposed adjacent the first or front end wall 22 in the first position FF, the third planetary gear set 50 is disposed adjacent the first planetary gear set 30 in the second position SM, the second compound planetary gear set 40 is disposed adjacent the third planetary gear set 50 in the third position TM and the fourth planetary gear set 60 is disposed adjacent the second or rear end wall 24 in the fourth position RF. The torque transmitting devices are intentionally located within specific Zones in order to provide advantages in overall transmission size, packaging efficiency, and reduced manufacturing complexity. In the second embodiment automatic transmission 200 shown in FIG. 4A, the first clutch 82 and the second clutch 84 are disposed in Zone B, the third clutch 86 is disposed in Zone D, the first brake 92 is disposed in Zone F and the second brake 94 is disposed in Zone E.

Figure 4B:
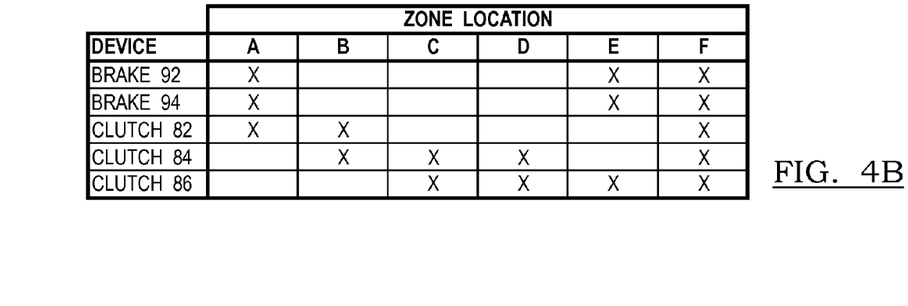
FIG. 4B is a chart showing feasible locations of the clutch and brake components for the second embodiment of the automatic transmission shown in FIG. 4A.

However, the second embodiment of the automatic transmission 200 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 4B. An "X" in the chart indicates that the second embodiment of the automatic transmission 200 comprehends locating the first clutch 82, the second clutch 84, the third clutch 86, the first brake 92 and the second brake 94 in the referenced Zone.

Figure 5A:
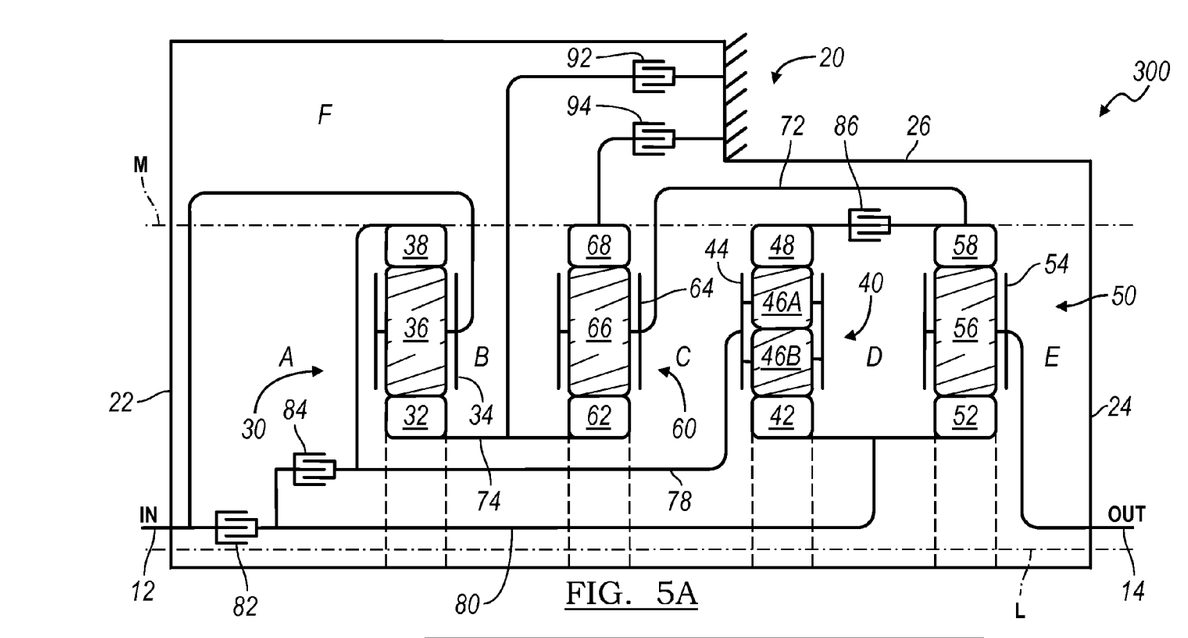
FIG. 5A is a schematic diagram of a third embodiment of an automatic transmission according to the principles of the present invention.

Referring now to FIG. 5A, a third embodiment of the automatic transmission 300 is shown. In the third embodiment of the automatic transmission 300, the planetary gear sets are longitudinally arranged in the following order from left to right: 30-60-40-50. Specifically, the first planetary gear set 30 is disposed adjacent the first or front end wall 22 in the first position FF, the fourth planetary gear set 60 is disposed adjacent the first planetary gear set 30 in the second position SM, the second compound planetary gear set 40 is disposed adjacent the fourth planetary gear set 60 in the third position TM and the third planetary gear set 50 is disposed adjacent the second or rear end wall 24 in the fourth position RF. The torque transmitting devices are intentionally located within specific Zones in order to provide advantages in overall transmission size, packaging efficiency, and reduced manufacturing complexity. In the third embodiment automatic transmission 300 shown in FIG. 5A, the first clutch 82 and the second clutch 84 are disposed in Zone A, the third clutch 86 is disposed in Zone D and the first brake 92 and the second brake 94 are disposed in Zone F.

Figure 5B:
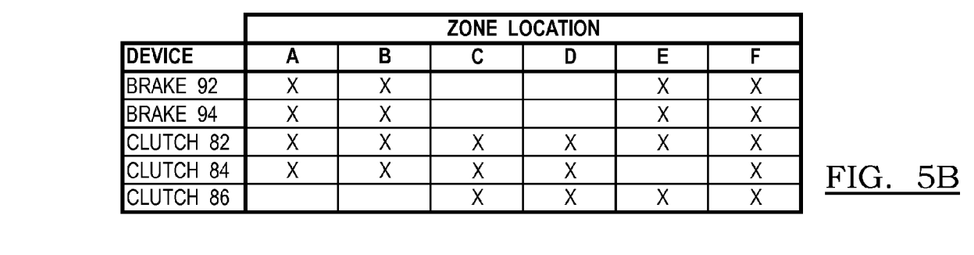
FIG. 5B is a chart showing feasible locations of the clutch and brake components for the third embodiment of the automatic transmission shown in FIG. 5A.

However, the third embodiment of the automatic transmission 300 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 5B. An "X" in the chart indicates that the third embodiment of the automatic transmission 300 comprehends locating the first clutch 82, the second clutch 84, the third clutch 86, the first brake 92 and the second brake 94 in the referenced Zone.

Figure 6A:
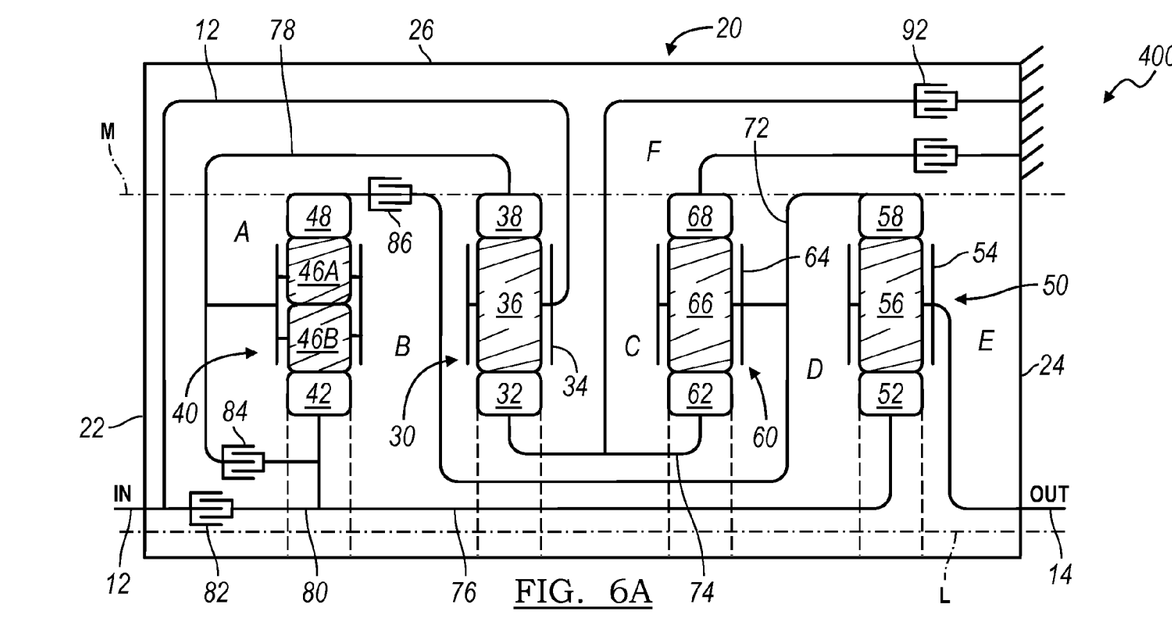
FIG. 6A is a schematic diagram of a fourth embodiment of an automatic transmission according to the principles of the present invention.

Referring now to FIG. 6A, a fourth embodiment of the automatic transmission 400 is shown. In the fourth embodiment of the automatic transmission 400, the planetary gear sets are longitudinally arranged in the following order from left to right: 40-30-60-50. Specifically, the second compound planetary gear set 40 is disposed adjacent the first or front end wall 22 in the first position FF, the first planetary gear set 30 is disposed adjacent the second compound planetary gear set 40 in the second position SM, the fourth planetary gear set 60 is disposed adjacent the first planetary gear set 30 in the third position TM and the third planetary gear set 50 is disposed adjacent the second or rear end wall 24 in the fourth position RF. The torque transmitting devices are intentionally located within specific Zones in order to provide advantages in overall transmission size, packaging efficiency, and reduced manufacturing complexity. In the fourth embodiment automatic transmission 400 shown in FIG. 6A, the first clutch 82 and the second clutch 84 are disposed in Zone A, the third clutch 86 is disposed in Zone B and the first brake 92 and the second brake 94 are disposed in Zone F.

Figure 6B:
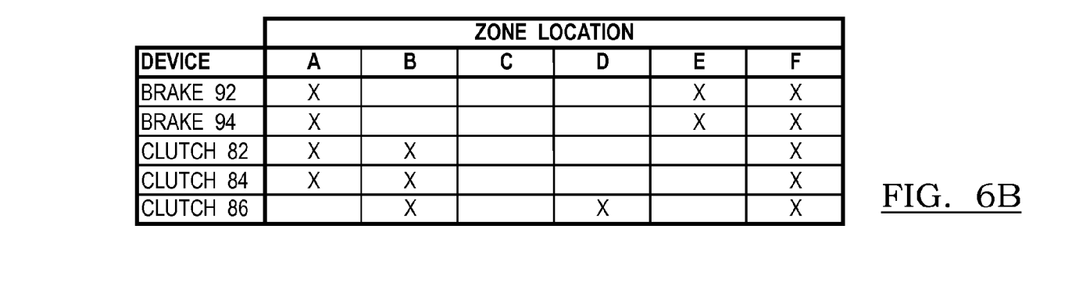
FIG. 6B is a chart showing feasible locations of the clutch and brake components for the fourth embodiment of the automatic transmission shown in FIG. 6A.

However, the fourth embodiment of the automatic transmission 400 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 6B. An "X" in the chart indicates that the fourth embodiment of the automatic transmission 400 comprehends locating the first clutch 82, the second clutch 84, the third clutch 86, the first brake 92 and the second brake 94 in the referenced Zone.

Figure 7A:
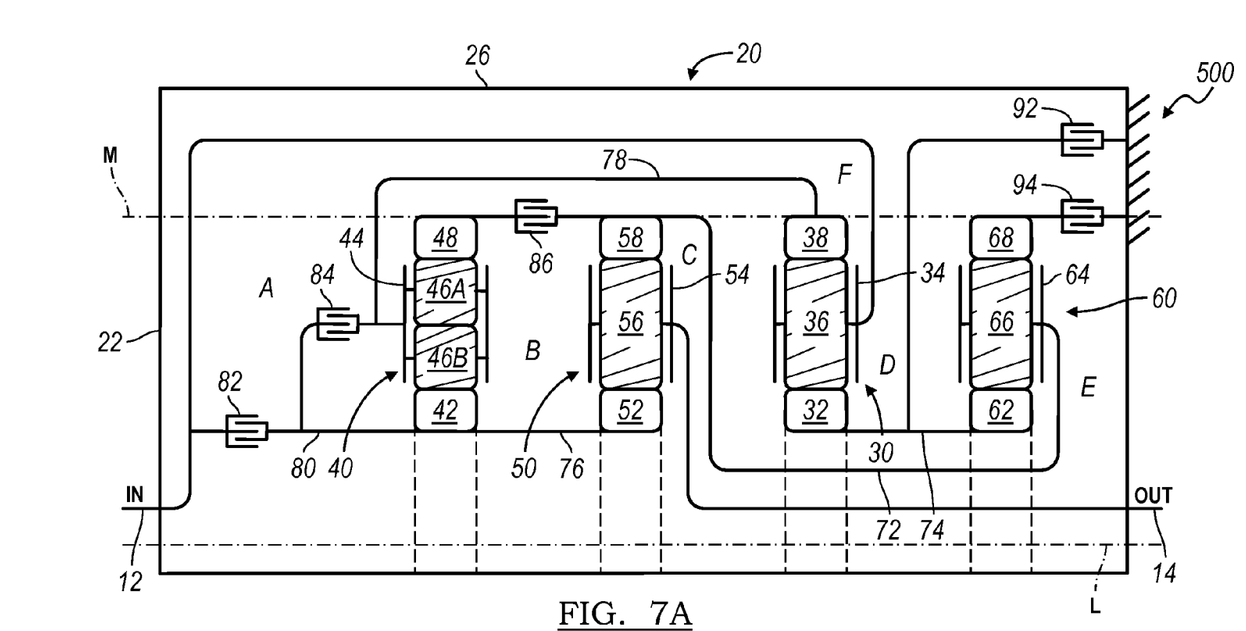
FIG. 7A is a schematic diagram of a fifth embodiment of an automatic transmission according to the principles of the present invention.

Referring now to FIG. 7A, a fifth embodiment of the automatic transmission 500 is shown. In the fifth embodiment of the automatic transmission 500, the planetary gear sets are longitudinally arranged in the following order from left to right: 40-50-30-60. Specifically, the second compound planetary gear set 40 is disposed adjacent the first or front end wall 22 in the first position FF, the third planetary gear set 50 is disposed adjacent the second compound planetary gear set 40 in the second position SM, the first planetary gear set 30 is disposed adjacent the third planetary gear set 50 in the third position TM and the fourth planetary gear set 60 is disposed adjacent the second or rear end wall 24 in the fourth position RF. The torque transmitting devices are intentionally located within specific Zones in order to provide advantages in overall transmission size, packaging efficiency, and reduced manufacturing complexity. In the fifth embodiment automatic transmission 500 shown in FIG. 7A, the first clutch 82 and the second clutch 84 are disposed in Zone A, the third clutch 86 is disposed in Zone B, the first brake 92 is disposed in Zone F and the second brake 94 is disposed in Zone E.

Figure 7B:
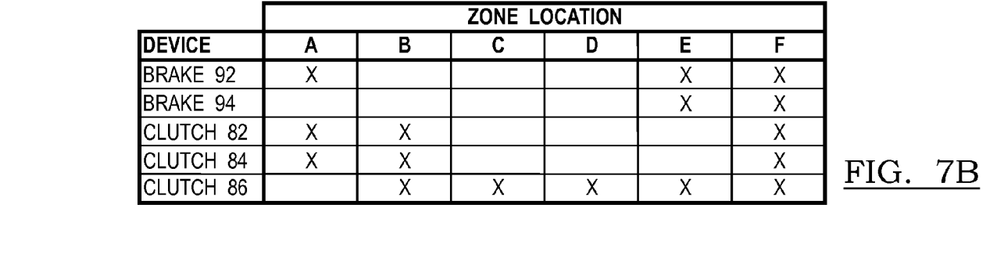
FIG. 7B is a chart showing feasible locations of the clutch and brake components for the fifth embodiment of the automatic transmission shown in FIG. 7A.

However, the fifth embodiment of the automatic transmission 500 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 7B. An "X" in the chart indicates that the fifth embodiment of the automatic transmission 500 comprehends locating the first clutch 82, the second clutch 84, the third clutch 86, the first brake 92 and the second brake 94 in the referenced Zone.

Figure 8A:
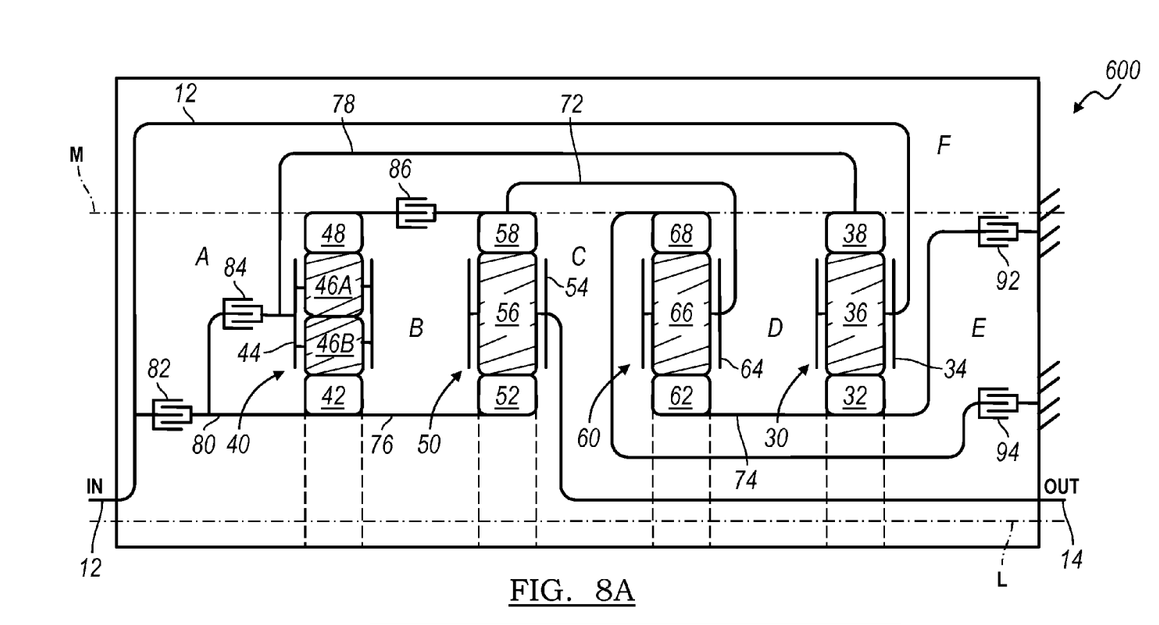
FIG. 8A is a schematic diagram of a sixth embodiment of an automatic transmission according to the principles of the present invention.

Referring now to FIG. 8A, a sixth embodiment of the automatic transmission 600 is shown. In the sixth embodiment of the automatic transmission 600, the planetary gear sets are longitudinally arranged in the following order from left to right: 40-50-60-30. Specifically, the second compound planetary gear set 40 is disposed adjacent the first or front end wall 22 in the first position FF, the third planetary gear set 50 is disposed adjacent the second compound planetary gear set 40 in the second position SM, the fourth planetary gear set 60 is disposed adjacent the third planetary gear set 50 in the third position TM and the first planetary gear set 30 is disposed adjacent the second or rear end wall 24 in the fourth position RF. The torque transmitting devices are intentionally located within specific Zones in order to provide advantages in overall transmission size, packaging efficiency, and reduced manufacturing complexity. In the sixth embodiment automatic transmission 600 shown in FIG. 8A, the first clutch 82 and the second clutch 84 are disposed in Zone A, the third clutch 86 is disposed in Zone B and the first brake 92 and the second brake 94 are disposed in Zone E.

Figure 8B:
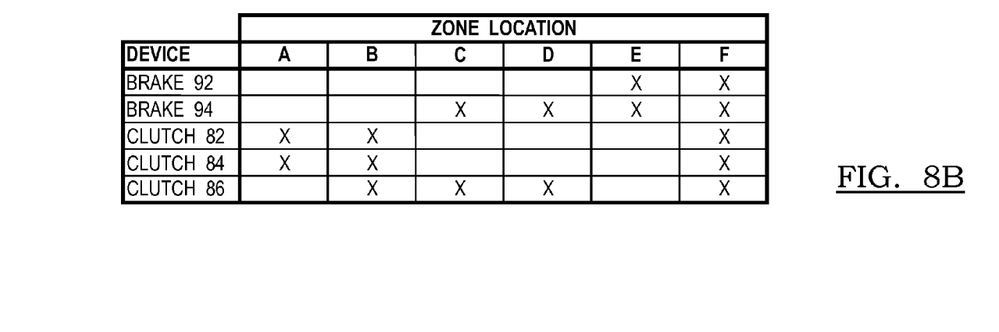
FIG. 8B is a chart showing feasible locations of the clutch and brake components for the sixth embodiment of the automatic transmission shown in FIG. 8A.

However, the sixth embodiment of the automatic transmission 600 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 8B. An "X" in the chart indicates that the sixth embodiment of the automatic transmission 600 comprehends locating the first clutch 82, the second clutch 84, the third clutch 86, the first brake 92 and the second brake 94 in the referenced Zone.

Figure 9A:
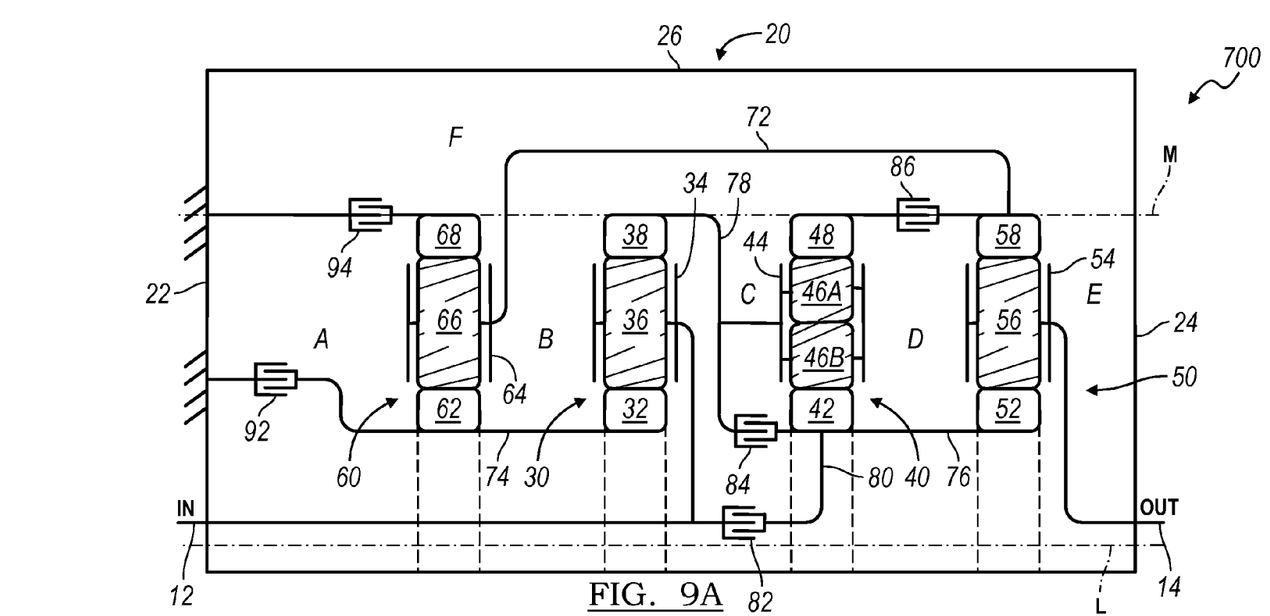
FIG. 9A is a schematic diagram of a seventh embodiment of an automatic transmission according to the principles of the present invention.

Referring now to FIG. 9A, a seventh embodiment of the automatic transmission 700 is shown. In the seventh embodiment of the automatic transmission 700, the planetary gear sets are longitudinally arranged in the following order from left to right: 60-30-40-50. Specifically, the fourth planetary gear set 60 is disposed adjacent the first or front end wall 22 in the first position FF, the first planetary gear set 30 is disposed adjacent the fourth planetary gear set 60 in the second position SM, the second compound planetary gear set 40 is disposed adjacent the first planetary gear set 30 in the third position TM and the third planetary gear set 50 is disposed adjacent the second or rear end wall 24 in the fourth position RF. The torque transmitting devices are intentionally located within specific Zones in order to provide advantages in overall transmission size, packaging efficiency, and reduced manufacturing complexity. In the seventh embodiment automatic transmission 700 shown in FIG. 9A, the first clutch 82 and the second clutch 84 are disposed in Zone C, the third clutch 86 is disposed in Zone D and the first brake 92 and the second brake 94 are disposed in Zone A.

Figure 9B:
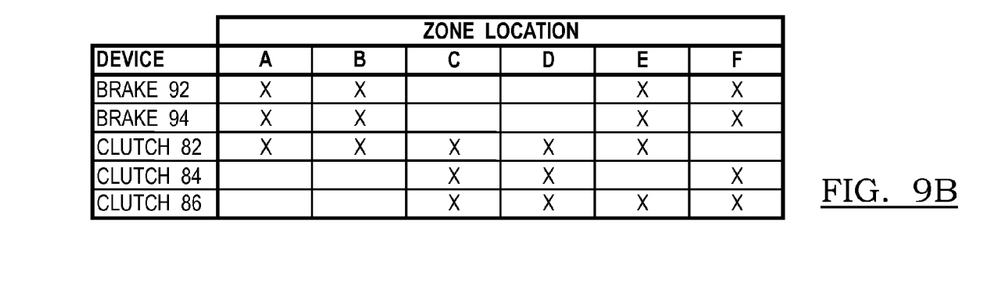
FIG. 9B is a chart showing feasible locations of the clutch and brake components for the seventh embodiment of the automatic transmission shown in FIG. 9A.

However, the seventh embodiment of the automatic transmission 700 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 9B. An "X" in the chart indicates that the seventh embodiment of the automatic transmission 700 comprehends locating the first clutch 82, the second clutch 84, the third clutch 86, the first brake 92 and the second brake 94 in the referenced Zone.

Figure 10A:
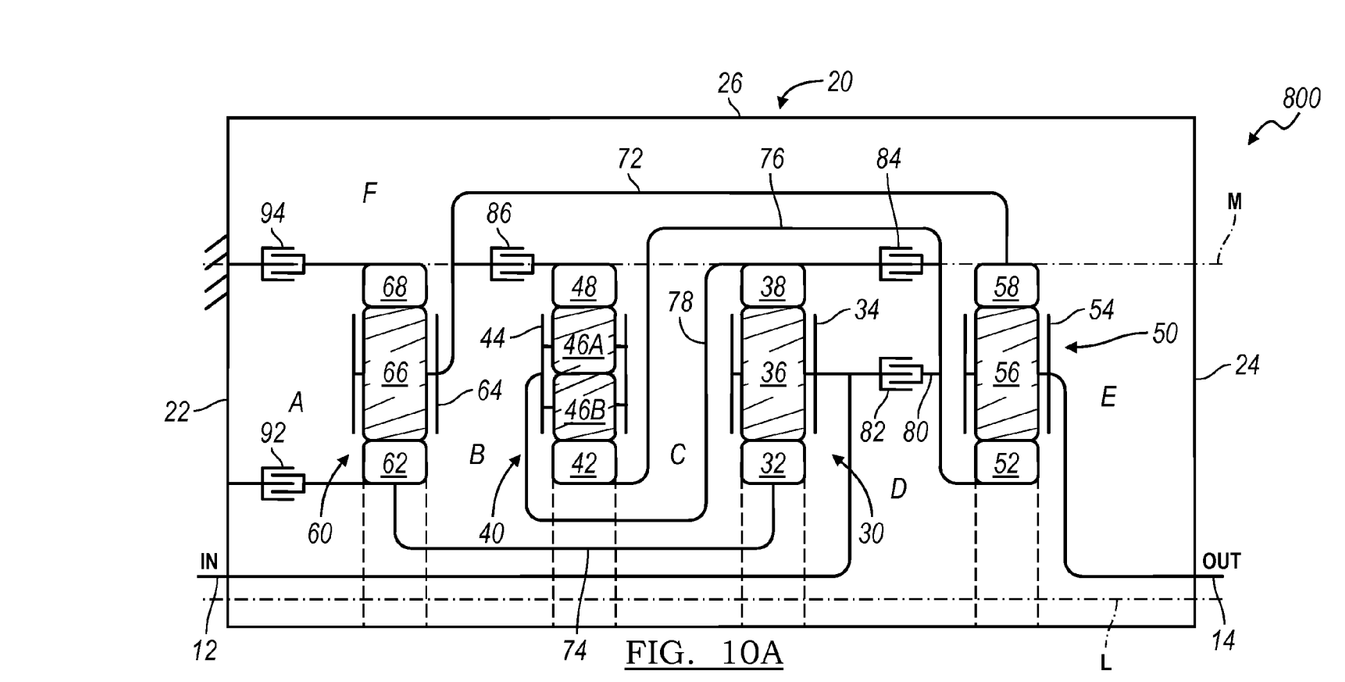
FIG. 10A is a schematic diagram of an eighth embodiment of an automatic transmission according to the principles of the present invention.

Referring now to FIG. 10A, an eighth embodiment of the automatic transmission 800 is shown. In the eighth embodiment of the automatic transmission 800, the planetary gear sets are longitudinally arranged in the following order from left to right: 60-40-30-50. Specifically, the fourth planetary gear set 60 is disposed adjacent the first or front end wall 22 in the first position FF, the second compound planetary gear set 40 is disposed adjacent the fourth planetary gear set 60 in the second position SM, the first planetary gear set 30 is disposed adjacent the second compound planetary gear set 40 in the third position TM and the third planetary gear set 50 is disposed adjacent the second or rear end wall 24 in the fourth position RF. The torque transmitting devices are intentionally located within specific Zones in order to provide advantages in overall transmission size, packaging efficiency, and reduced manufacturing complexity. In the eighth embodiment automatic transmission 800 shown in FIG. 10A, the first clutch 82 and the second clutch 84 are disposed in Zone D, the third clutch 86 is disposed in Zone B and the first brake 92 and the second brake 94 are disposed in Zone A.

Figure 10B:
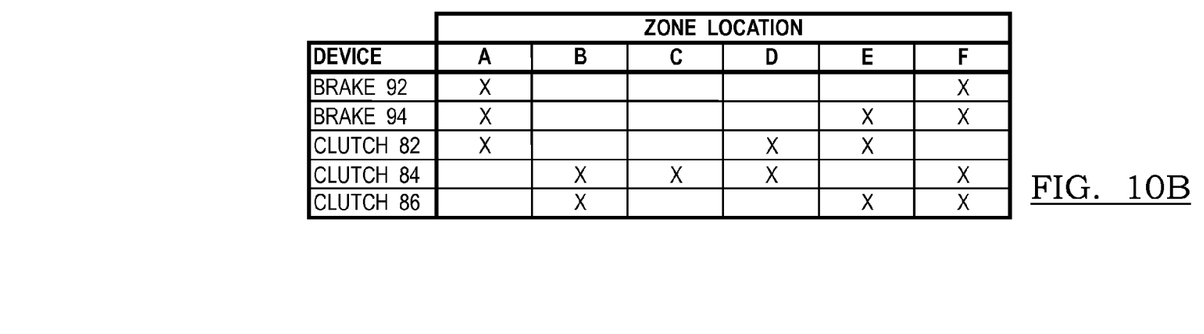
FIG. 10B is a chart showing feasible locations of the clutch and brake components for the eighth embodiment of the automatic transmission shown in FIG. 10A.

However, the eighth embodiment of the automatic transmission 800 includes other arrangements where the first clutch 82, the second clutch 84, the third clutch 86, the first brake 92 and the second brake 94 are disposed in other Zones. The feasible locations of the first clutch 82, the second clutch 84, the third clutch 86, the first brake 92 and the second brake 94 relative to the Zones are illustrated in the chart shown in FIG. 10B. An "X" in the chart indicates that the eighth embodiment of the automatic transmission 800 comprehends locating the first clutch 82, the second clutch 84, the third clutch 86, the first brake 92 and the second brake 94 in the referenced Zone.

The description of the invention is merely exemplary in nature and variations that do not depart from the gist of the invention are intended to be within the scope of the invention. Such variations are not to be regarded as a departure from the spirit and scope of the invention.

What is claimed is:

1. An automatic transmission comprising:
    an input member;
    an output member;
    a transmission housing having a first wall, a second wall and a third wall extending between said first and said second walls;
    a first, a second, a third and a fourth planetary gear assembly disposed within said transmission housing, wherein said first planetary gear assembly is adjacent said first wall, said third planetary gear assembly is adjacent said first planetary gear assembly, said second planetary gear assembly is adjacent said third planetary gear assembly, and said fourth planetary gear assembly is between said second planetary gear assembly and said second wall, each of said planetary gear assemblies including a sun gear member, a ring gear member, and a planet carrier member supporting a plurality of planet gears meshing with said sun gear member and said ring gear member,
    wherein said input member is coupled to said planet carrier of said first planetary gear assembly, said output member is coupled to said planet carrier of said third planetary gear assembly, said ring gear member of said third planetary gear assembly is coupled to said planet carrier of said fourth planetary gear assembly, said sun gear member of said first planetary gear assembly is coupled to said sun gear member of said fourth planetary gear assembly, said sun gear member of said second planetary gear assembly is coupled to said sun gear member of said third planetary gear assembly and said ring gear member of said first planetary gear assembly is coupled to said planet carrier of said second planetary gear assembly,
    wherein said transmission housing has a first area radially inward from an outer periphery of said planetary gear assemblies and axially bounded by said first wall and said first planetary gear assembly, a second area radially inward from said outer periphery of said planetary gear assemblies and axially bounded by said first and said third planetary gear assemblies, a third area radially inward from said outer periphery of said planetary gear assemblies and axially bounded by said third and said second planetary gear assemblies, a fourth area radially inward from said outer periphery of said planetary gear assemblies and axially bounded by said second and said fourth planetary gear assemblies, a fifth area radially inward from said outer periphery of said planetary gear assemblies and axially bounded by said fourth planetary gear assembly and said second wall, and a sixth area between said outer periphery of said planetary gear assemblies and said third wall and axially bounded by said first wall and said second wall;
    a first clutch selectively engageable between said planet carrier of said first planetary gear assembly and said sun gear member of said second planetary gear assembly;
    a second clutch selectively engageable between said sun gear member of said second planetary gear assembly and said planet carrier of said second planetary gear assembly;
    a third clutch selectively engageable between said ring gear member of said second planetary gear assembly and said ring gear member of said third planetary gear assembly;
    a first brake selectively engageable between said sun gear member of said fourth planetary gear assembly and said transmission housing; and
    a second brake selectively engageable between said ring gear member of said fourth planetary gear assembly and said transmission housing,
    wherein said first clutch is located in one of said first, second and sixth areas, said second clutch is located in one of said second, third, fourth and sixth areas, said third clutch is located in said fourth area, said first brake is located in one of said first, fifth and sixth areas and said second brake is located in one of said first, fifth and sixth areas, and
    wherein said clutches and brakes are selectively engageable to establish at least eight forward speed ratios and one reverse speed ratio between said input member and said output member.

2. The automatic transmission of claim 1 wherein at least one of said first clutch, said first brake, and said second brake is located in said first area.

3. The automatic transmission of claim 1 wherein at least one of said first clutch and said second clutch is located in said second area.

4. The automatic transmission of claim 1 wherein one of said second clutch and said third clutch is located in said third area.

5. The automatic transmission of claim 1 wherein one of said second clutch and said third clutch is located in said fourth area.

6. The automatic transmission of claim 1 wherein at least one of said third clutch, said first brake and said second brake is located in said fifth area.

7. The automatic transmission of claim 1 wherein at least one of said first clutch, said second clutch, said third clutch, said first brake and said second brake is located in said sixth area.

8. The automatic transmission of claim 1 wherein said first brake is located in said sixth area and said second brake is located in at least one of said fifth area and said sixth area.

9. The automatic transmission of claim 1 wherein said first clutch is located in said first area.

10. The automatic transmission of claim 1 wherein said first clutch is located in said second area.

11. The automatic transmission of claim 1 wherein said first clutch is located in said sixth area.

12. The automatic transmission of claim 1 wherein said second clutch is located in said second area.

13. The automatic transmission of claim 1 wherein said second clutch is located in said third area.

14. The automatic transmission of claim 1 wherein said second clutch is located in said fourth area.

15. The automatic transmission of claim 1 wherein said second clutch is located in said sixth area.

16. An automatic transmission comprising:
an input member;
an output member;
a transmission housing having a first wall, a second wall and a third wall extending between said first and said second walls;
a first, a second, a third and a fourth planetary gear assembly disposed within said transmission housing, wherein said first planetary gear assembly is adjacent said first wall, said third planetary gear assembly is adjacent said first planetary gear assembly, said second planetary gear assembly is adjacent said third planetary gear assembly, and said fourth planetary gear assembly is between said second planetary gear assembly and said second wall, each of said planetary gear assemblies including a sun gear member, a ring gear member, and a planet carrier member supporting a plurality of planet gears meshing with said sun gear member and said ring gear member, wherein said input member is coupled to said planet carrier of said first planetary gear assembly, said output member is coupled to said planet carrier of said third planetary gear assembly, said ring gear member of said third planetary gear assembly is coupled to said planet carrier of said fourth planetary gear assembly, said sun gear member of said first planetary gear assembly is coupled to said sun gear member of said fourth planetary gear assembly, said sun gear member of said second planetary gear assembly is coupled to said sun gear member of said third planetary gear assembly and said ring gear member of said first planetary gear assembly is coupled to said planet carrier of said second planetary gear assembly,
wherein said transmission housing has a first area radially inward from an outer periphery of said planetary gear assemblies and axially bounded by said first wall and said first planetary gear assembly, a second area radially inward from said outer periphery of said planetary gear assemblies and axially bounded by said first and said third planetary gear assemblies, a third area radially inward from said outer periphery of said planetary gear assemblies and axially bounded by said third and said second planetary gear assemblies, a fourth area radially inward from said outer periphery of said planetary gear assemblies and axially bounded by said second and said fourth planetary gear assemblies, a fifth area radially inward from said outer periphery of said planetary gear assemblies and axially bounded by said fourth planetary gear assembly and said second wall, and a sixth area between said outer periphery of said planetary gear assemblies and said third wall and axially bounded by said first wall and said second wall;
a first clutch selectively engageable between said planet carrier of said first planetary gear assembly and said sun gear member of said second planetary gear assembly;
a second clutch selectively engageable between said sun gear member of said second planetary gear assembly and said planet carrier of said second planetary gear assembly;
a third clutch selectively engageable between said ring gear member of said second planetary gear assembly and said ring gear member of said third planetary gear assembly;
a first brake selectively engageable between said sun gear member of said fourth planetary gear assembly and said transmission housing; and
a second brake selectively engageable between said ring gear member of said fourth planetary gear assembly and said transmission housing,
wherein said first clutch is located in said second area, said second clutch is at least partially located in at least one of said second and sixth areas, said third clutch is at least partially located in said fourth area, said first brake is located in said sixth area, and said second brake is at least partially located in at least one of said fifth and sixth areas, and
wherein said clutches and brakes are selectively engageable to establish at least eight forward speed ratios and one reverse speed ratio between said input member and said output member.

* * * * *